United States Patent
Shin et al.

(10) Patent No.: US 9,306,415 B2
(45) Date of Patent: Apr. 5, 2016

(54) POWER CONSUMPTION CONTROL APPARATUS AND POWER CONSUMPTION CONTROL METHOD

(71) Applicant: Samsung Electronics Co., Ltd., Suwon-si (KR)

(72) Inventors: Jong Hyun Shin, Suwon-si (KR); Young Jin Park, Bucheon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 666 days.

(21) Appl. No.: 13/707,980

(22) Filed: Dec. 7, 2012

(65) Prior Publication Data
US 2013/0169046 A1 Jul. 4, 2013

(30) Foreign Application Priority Data
Dec. 12, 2011 (KR) .................. 10-2011-0132788

(51) Int. Cl.
*H02J 9/00* (2006.01)
*H02J 9/06* (2006.01)

(52) U.S. Cl.
CPC . *H02J 9/00* (2013.01); *H02J 9/062* (2013.01); *Y02B 10/72* (2013.01); *Y10T 307/344* (2015.04); *Y10T 307/625* (2015.04)

(58) Field of Classification Search
CPC ........ H02J 9/00; H02J 9/062; Y10T 307/344; Y10T 307/625; Y02B 10/72
USPC .......................................................... 307/43
See application file for complete search history.

(56) References Cited

U.S. PATENT DOCUMENTS

| | | | | |
|---|---|---|---|---|
| 4,675,538 | A * | 6/1987 | Epstein | 307/64 |
| 5,319,571 | A * | 6/1994 | Langer et al. | 713/300 |
| 2007/0222295 | A1* | 9/2007 | Wareham et al. | 307/32 |
| 2010/0019574 | A1* | 1/2010 | Baldassarre et al. | 307/23 |

FOREIGN PATENT DOCUMENTS

| | | |
|---|---|---|
| JP | 2003-319560 | 11/2003 |
| JP | 2009-148009 | 7/2009 |

* cited by examiner

*Primary Examiner* — Thienvu Tran
*Assistant Examiner* — Kevin J Comber
(74) *Attorney, Agent, or Firm* — Staas & Halsey LLP (57) ABSTRACT

A power consumption control apparatus and a power consumption control method capable of providing a power storage being utilized as an uninterruptible power supply (UPS), and in a case of an emergency, automatically selecting a load to supply a backup power to the load, the power consumption control method including determining an occurrence of an abnormality in a supply of a grid power and a renewable power, performing an emergency mode to immediately finish a current operation of a load if it is determined that an abnormality in the supply of both of the grid power and the renewable power has occurred, and performing a standby mode to stand by until the current operation of the load is finished in a normal manner if it is determined that an abnormality in the supply of the grid power has occurred while the supply of the renewable power is normal.

9 Claims, 5 Drawing Sheets

POWER CONSUMPTION CONTROL APPARATUS AND POWER CONSUMPTION CONTROL METHOD

CROSS-REFERENCE TO RELATED APPLICATIONS

This application claims the priority benefit of Korean Patent Application No. 10-2011-0132788, filed on Dec. 12, 2011 in the Korean Intellectual Property Office, the disclosure of which is incorporated herein by reference.

BACKGROUND

1. Field

The following description relates to a power consumption control apparatus and a power consumption control method. More particularly, the following description relates to a power consumption control apparatus and a power consumption control method of a power consumption subject, which consumes power, provided with a power storage unit therein.

2. Description of the Related Art

At a power consumption subject, which consumes power and is provided with a power storage unit therein, the power storage unit is only used to store surplus power. In addition, with respect to charging the power storage unit or discharging the power stored in the power storage unit, the power stored at the power storage unit is used without considering the status of the power supply and the status of the power consumption of a load. Thus, power usage of the power storage unit may be ineffective.

SUMMARY

Therefore, it is an aspect of the present disclosure to provide a power storage unit utilized as an uninterruptible power supply (UPS), where in case of an emergency, by automatically selecting a load, backup power may be supplied to the load.

Additional aspects of the disclosure will be set forth in part in the description which follows and, in part, will be obvious from the description, or may be learned by practice of the disclosure.

In accordance with an aspect of the present disclosure, a power consumption control method is as follows. An occurrence of an abnormality in a supply of primary power and secondary power may be determined. The primary power may be grid power, and the secondary power may be renewable power. An emergency mode is performed to immediately finish a current operation of a load if it is determined that an abnormality in the supply of both the grid power and the renewable power has occurred. A standby mode to stand by until the current operation of the load is finished in a normal manner may be performed if it is determined that an abnormality in the supply of the grid power has occurred while the supply of the renewable power is normal.

The performing of the emergency mode may include storing information of a status of the current operation of the load into a memory, and turning off a switch that is involved in the supply of the power of the load.

The performing of the standby mode may include standing by until the current operation of the load is finished in a normal manner, and turning off a switch that is involved in the supply of the power of the load if the current operation of the load is finished in a normal manner.

The renewable power may be supplied to the load during the standing by until the current operation of the load is finished in a normal manner.

When the load is provided in a plurality thereof and an amount of power stored at a power storage unit is less than an amount of power consumption demanded at all of the plurality of loads, some of the plurality of loads may be selected, and the power may be supplied only to the selected plurality of loads.

The selection of the some of the plurality of loads may be performed by setting an order of priority based on a power usage history of each of the plurality of loads and by selecting a load having a higher order of priority first, according to the set order of priority.

The power usage history of the each of the plurality of loads may include a usage frequency by a time period and an average usage time of the each of the plurality of loads.

The selection of the some of the plurality of loads may be performed by setting an order of priority by receiving a user setting that is provided to select the some of the plurality of loads, and by selecting a load having a higher order of priority first, according to the set order of priority.

In accordance with an aspect of the present disclosure, a power consumption control apparatus includes a power storage unit, a power conversion unit, and a control unit. The power storage unit may be configured to be charged and discharged with power. The power conversion unit may be configured to perform the charging and the discharging of power of the power storage unit. The control unit may be configured to determine an occurrence of an abnormality in a supply of a grid power and a renewable power, perform an emergency mode to immediately finish a current operation of a load if it is determined that an abnormality in the supply of both of the grid power and the renewable power has occurred, and perform a standby mode to stand by until the current operation of the load is finished in a normal manner if it is determined that an abnormality in the supply of the grid power has occurred while the supply of the renewable power is normal.

The control unit, in a case of the emergency mode, may store information of a status of the current operation of the load into a memory, and turn off a switch that is involved in the supply of the power of the load.

The control unit, in a case of the standby mode, may stand by until the current operation of the load is finished in a normal manner, and turn off a switch that is involved in the supply of the power of the load after the current operation of the load is finished in a normal manner.

The control unit may supply the renewable power to the load during a time of standing by until the current operation of the load is finished in a normal manner.

When the load is provided in a plurality thereof and an amount of power stored at the power storage unit is less than an amount of the power consumption demanded at all of the plurality of loads, the control unit may select some of the plurality of loads, and the power may be supplied only to the some of the plurality of loads.

The control unit may select the some of the plurality of loads by setting an order of priority based on a power usage history of each of the plurality of loads, and by selecting a load having a higher order of priority first, according to the set order of priority.

The power usage history of the each of the plurality of loads may include a usage frequency by a time period and an average usage time of the each of the plurality of loads.

The control unit may select the some of the plurality of loads by setting an order of priority by receiving a user setting that is provided to select the some of the plurality of loads, and by selecting a load having a higher order of priority first, according to the set order of priority.

In accordance with an aspect of the present disclosure, a power control method includes detecting an abnormality in at least one of a primary power supply and a secondary power supply, and selectively enabling a first mode when an abnormality is detected in the primary power supply and the secondary power supply is normal, or a second mode when an abnormality is detected in both the primary power supply and the secondary power supply, wherein the first mode provides power to a load while a current operation of a load is completed, and then removes power to the load, and the second mode stores information regarding the status of the current operation of the load, and then removes power from the load.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3, part (a) and FIG. 3, part (b) are drawings showing a communication of a control unit of a power consumption control apparatus and a load of a power consumption control apparatus in accordance with an embodiment of the present disclosure.

DETAILED DESCRIPTION

Reference will now be made in detail to the embodiments of the present disclosure, examples of which are illustrated in the accompanying drawings, wherein like reference numerals refer to like elements throughout.

Figure 1:
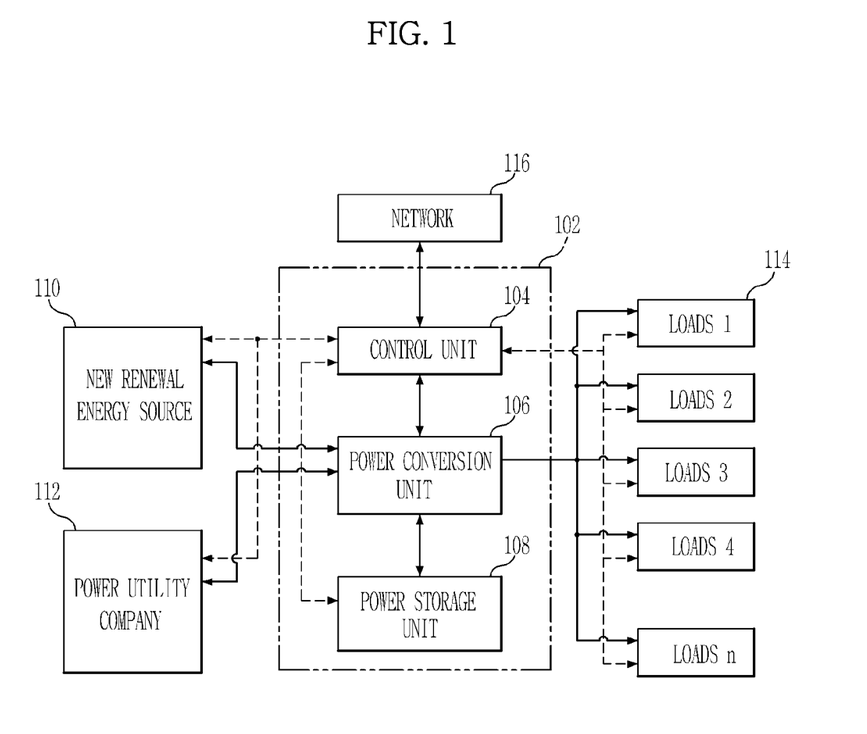
FIG. 1 is a drawing showing a structure of a power consumption control apparatus in accordance with an embodiment of the present disclosure.

FIG. 1 is a drawing showing a structure of a power consumption control apparatus in accordance with an embodiment of the present disclosure. As shown on FIG. 1, a power consumption control apparatus 102 in accordance with an embodiment of the present disclosure includes a control unit 104, a power conversion unit 106, and a power storage unit 108. The power consumption control apparatus 102 is provided at a power consumption subject, such as a household or business, for example, that consumes electricity and provides a payment for the consumed electricity, and is configured to control the supply/demand and the consumption of the power to help the subject of the power consumption to use the power efficiently.

The control unit 104 of the power consumption control apparatus 102 controls the entire operation of the power consumption control apparatus 102, so that an efficient use of power may take place. For the above, the control unit 104 exchanges information with the power conversion unit 106, the power storage unit 108, a load 114, an outside renewable energy source 110, an outside power utility company 112, that is, a subject of power supply, and an outside network 116 by electrically communicating with each other. The control unit 104, through the outside network 116, receives weather information, and uses the weather information to forecast the amount of the renewable power generated at the renewable energy source 110. For example, the information collected by the control unit 104 to generate solar power includes the amount of solar radiation, the distribution of clouds, moving directions of clouds, temperature, and calibration factor, for example. The control unit 104 receives the information such as the supply/demand status of power supply and the price of electricity by communicating with the power utility company 112. The control unit 104 analyzes the power usage pattern at the load 114, and forecasts the amount of power consumption at the load 114 by communicating with the load 114. The control unit 104 secures the charging status information of the power storage unit 108 through the communication with the power storage unit 108. As shown on FIG. 1, the control unit 104 may be provided inside the power consumption control apparatus 102, or may be connected to the power consumption control apparatus 102 through the network while provided in a form of an external server.

The power conversion unit 106 of the power consumption control apparatus 102 performs the charging and the discharging, and the conversion of the power of the power storage unit 108. That is, the power conversion unit 106 delivers the renewable power, which is supplied from the renewable energy source 110, or the grid power, which is supplied from the power utility company 112, to the power storage unit 108, so that the renewable power or the grid power is stored at the power storage unit 108, or supplies the supplied power to the load 114 such that the load 114 consumes the power needed. In addition, the power conversion unit 106 changes the flow, or direction, of the power, and converts the electrical features, such as a frequency and a phase, of the power. For example, DC power is converted to single-phase AC power, or to polyphase AC power.

The power storage unit 108 of the power consumption control apparatus 102 stores the power while being charged from an external power supply, and by discharging the power stored, the power is consumed. For example, the power storage unit 108 stores (charges) the renewable power, which is supplied from the renewable energy source 110, or the grid power, which is supplied from the power utility company 112, so that the renewable power or the grid power is stored at the power storage unit 108, and the power storage unit 108 provides (discharges) the stored power to the load 114 or to the power utility company 112. The supply of the power to the power utility company 112 from the power storage unit 108 represents the resale of the power, in other words, the reselling of the power which is purchased.

The renewable energy source 110 refers to energy and renewable energy. The energy includes such technologies such as fuel cells, coal liquefaction/gasification, and hydrogen energy, for example. The fuel cell, through the chemical reaction of hydrogen and oxygen in air, directly converts chemical energy, which is generated by the oxidation of the hydrogen, into electric energy. The coal liquefaction/gasification is a technology to attain energy by liquefying or gasifying coals. The coal liquefaction is a technology to change coals, which are solid fuel, to liquid fuel such as gasoline and diesel fuel. The technology as such includes a direct liquefaction method configured to change coals, which are in a high-temperature, high-pressure state, by using solvent, and a indirect liquefaction method configured to change coals to liquid fuel on a catalyst after the gasification of coals. The gasification of coals is a technology configured to generate power by driving a gas turbine or a steam turbine by using synthetic gas. This gas is produced by having low-quality fuels, such as coals and intermediate quality residue oil, imperfectly combusted and gasified along with steam by using limited oxygen in a gasification apparatus at a high-temperature and high-pressure state, that is provided with carbon monoxide and hydrogen as key elements therein, and is passed through a purification process. A hydrogen gas technology is the technology configured to separately produce hydrogen, which exists in the form of compound matter such as water, organic matter, and fossil fuels, for example, for use as an energy source.

The renewable energy includes such technologies such as a solar thermal power generation and a solar photovoltaic power generation, biomass energy, a wind power generation, a small hydropower generation, geothermal energy, ocean energy, and waste energy, for example.

The solar thermal power generation is a system configured to create high-temperature air and steam by gathering solar heat to rotate a turbine for generation of power. At a heat collecting apparatus configured to change light into heat, the water supplied is heated to be vaporized, and the vaporized water is sent to a turbine through a heat storage tank. The principle of the power generation after the turbine is the same as the principle of a conventional thermal power generation.

The photovoltaic power generation is one of the power generation technologies by solar energy, and by using a photo-electric conversion apparatus called a solar battery, light energy of the sun is directly changed into electric energy. The photovoltaic power generation is configured to use light partially, and may be possible even on cloudy days.

The biomass is a method to produce energy by using trees and crops, vegetables and agricultural wastes, livestock wastes, and food wastes. For example, the methane or other gases, which are generated as the excrements of livestock or the wastes at dump yards that are decomposed, are burned to be used for a power generation or a heating.

A wind power generating apparatus is an apparatus configured to change the energy of winds into electric energy. By rotating the wings of the wind power generating apparatus, a rotating force is generated, and by using the rotating force, electricity is produced.

The small hydropower generation is a method of a power generation configured to create kinetic energy from small sized movement of water by potential energy at a stream, and the kinetic energy is changed into electric energy, which is generally less than approximately 20 MW, to obtain electricity. The difference of the small hydropower generation and a conventional hydraulic power generation is that the conventional hydraulic power generation obtains energy by the difference of the hydraulic heads of a multi-purpose dam, while the small hydropower generation uses the potential energy by the flow of water.

The geothermal energy is a form of energy that is used for a power generation to rotate a steam turbine by using the steam that is generated by injecting water to the geothermal energy source. At an area where there is no volcano, the geothermal energy at approximately 100° C. may be obtained from an underground depth of approximately 3,000 meters, and depending on an area, the temperature of the geothermal energy source may be higher.

The ocean energy is energy generated by high seas, tides, currents, ocean currents, and the difference in the temperature of sea waters. A wave-power generation, a tidal power generation, and an ocean thermal energy conversion are being used.

The waste energy is a technology configured to pyrolyze the waste having high energy content among the combustible wastes generated from a business or a household, to generate solid fuel, liquid fuel, gas fuel, and waste heat, and is configured to recycle the solid fuel, the liquid fuel, the gas fuel, and the waste heat to be used as energy needed for industrial activities.

The power utility company 112 is defined as a business that sells the power that is supplied from several power generation facilities. The power utility company 112 supplies power by setting the price of electricity consumed during a time period when the power consumption is small at a lower level when compared to the price of electricity consumed during a time period when the power consumption is large, and by setting the price of electricity consumed during the seasons when the power consumption is small at a lower level when compared to the price of electricity consumed during the seasons when the power consumption is large. As seen above, by flexibly setting the price of electricity in connection with the power consumption pattern of the consumer, the balance in the supply and the consumption of the power may be promoted. In addition, the power utility company 112, on the basis of the amount or power generation, the usage information of the power by time and season in the past, and weather information, forecasts the amount of the power consumption and sets the price of electricity. At this time, the pricing level corresponding to the price of electricity may be set. In addition, the power utility company 112 collects and stores the amount of the power consumption that is being consumed at the power consumption subject by each pricing level, and calculates the price of electricity in accordance with the amount of the power consumption at each subject of the power consumption at each pricing level, on a monthly basis, so that the calculated price of electricity may be invoiced on a monthly basis. In addition, the power utility company 112, by comparing the price of electricity that is periodically calculated with a predetermined price of electricity that is allotted on a monthly basis, determines the limitation on the power supply, and if the calculated price of electricity exceeds the price of electricity allotted on a monthly basis, the power utility company 112 transmits information on the excess of the price of electricity allotted on a monthly basis to the power consumption control apparatus 102 provided at the corresponding subject of the power consumption, so that an event related to the excess in the price of electricity allotted on a monthly basis may take place through the power consumption control apparatus 102. In addition, the power utility company 112 stores a threshold amount of power by each subject of power consumption, and determines the limitation of the power supply by comparing the amount of power consumption by each subject of power consumption with the threshold amount of power. In addition, as the above, the power utility company 112, on the basis of the threshold amount of power or the price of electricity allotted on a monthly basis, manages the demand of power of the subject of power consumption. Here, the threshold amount of power configured to limit the supply of power by each subject of power consumption may be randomly set by the power utility company 112 or is set by the agreement with the power utility company 112 of each subject of power consumption. The price of electricity allotted on a monthly basis at each subject of power consumption is set according to the agreement with the power utility company 112 of each consumer. In addition, the power utility company 112 stores and manages the information on the status of power consumption according to the occurrence of a threshold power exceed-related event by each subject of power consumption and according the occurrence of a monthly allotment exceed-related event by each subject of power consumption on a monthly basis. The power consumption control apparatus 102 above is connected to the control unit 104 each provided at a plurality of subjects of power consumption through the network, and transmits/receives the information needed for the management of the demand of power. The network may be a wire network, a wireless network, or a combined wire/wireless network.

In FIG. 1, with reference to the direction of the power being delivered while having the power conversion unit 106 as a center of the delivery, the power supply is delivered in a single direction from the renewable energy source 110 to the power conversion unit 106, and the power supply is delivered in a single direction from the power conversion unit 106 to the load 114. On the contrary to the above, a two-way supply of power takes place between the power conversion unit 106 and the power storage unit 108. The two-way supply of power between the power conversion unit 106 and the power storage unit 108 is achieved by the charge/discharge of the power storage unit 108. In addition, the two-way supply of power takes place between the power conversion unit 106 and the power utility company 112. The two-way supply of power between the power conversion unit 106 and the power utility company 112 takes place when the power is purchased and supplied from the power utility company 112, and when the power stored at the power storage unit 108 is resold to the power utility company 112.

Figure 2:
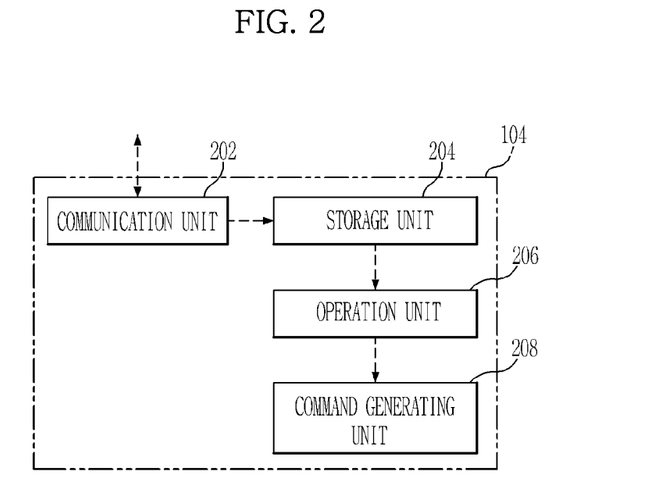
FIG. 2 is a drawing showing a structure of a control unit of the power consumption control apparatus shown on FIG. 1.

FIG. 2 is a drawing showing a structure of a control unit of the power consumption control apparatus shown on FIG. 1. As shown on FIG. 2, the control unit 104 includes a communication unit 202, a storage unit 204, an operation unit 206, and a command generation unit 208. The communication unit 202 electrically communicates with other apparatuses, which are the power conversion unit 106, the power storage unit 108, the load 114, the outside renewable energy source 110, the power utility company 112, and the outside network 116, in providing and collecting information. Above, the data collected through the communication is stored at the storage unit 204, and through the operation unit 206, the operation needed is performed and is provided to the command generation unit 208. The command generation unit 208 generates a control command configured to optimally control power consumption, and delivers the control command generated to other apparatuses, which are the power conversion unit 106, the power storage unit 108, the load 114, the outside renewable energy source 110, the power utility company 112, and the outside network 116.

Figure 3:
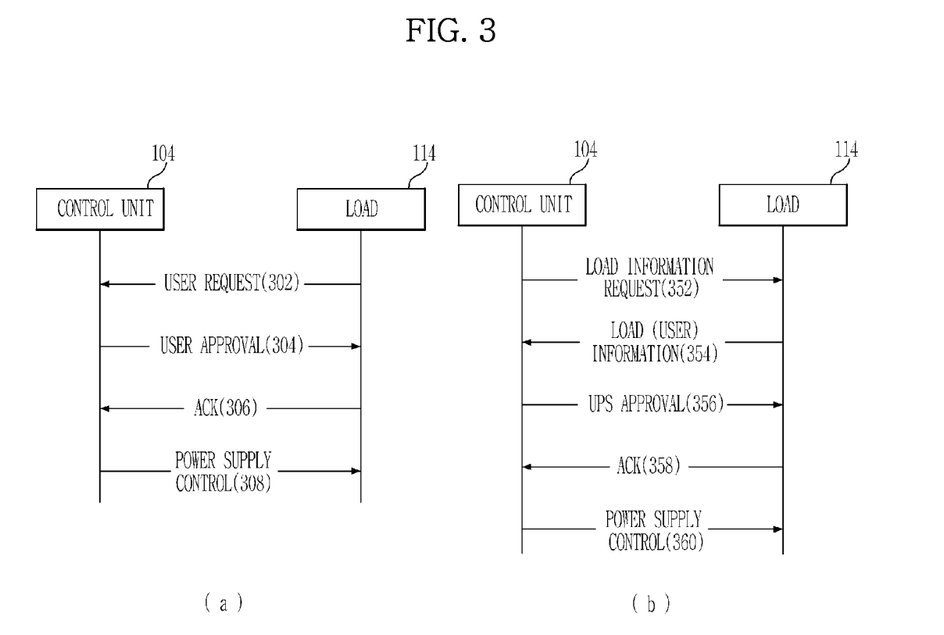

FIG. 3 is a drawing showing a communication of a control unit of a power consumption control apparatus and a load of a power consumption control apparatus in accordance with an embodiment of the present disclosure.

In FIG. 3, part (a) illustrates a case when the control unit 104 selects the load 114 in an uninterruptible power supply (UPS) mode by responding to a request that a user places through a direct setting. As shown in FIG. 3, part (a), when the control unit 104 selects the load 114 in the UPS mode by responding to the request that a user places through a direct configuration, the user first generates a user request to designate the particular load 114 for the power to be supplied as a priority (302). The control unit 114 generates an UPS approval by responding to the user request as notification that a selection is made to supply the power to the load requested by the user as a priority (304). The corresponding load 114 transmits an acknowledgement (ACK) with respect to the UPS approval to the control unit 104 (306). With the above, when an agreement with respect to the power supply at the UPS mode between the control unit 104 and the corresponding load 114 is made, the control unit 104 in the UPS mode controls the power conversion unit 106 such that the power is supplied to the corresponding load 114 as a priority according to the agreement (308).

In FIG. 3, part (b) illustrates a case when the control unit 104 automatically selects the load 114 in an uninterruptible power supply (UPS) mode in the order of corresponding to a predetermined standard set on the basis of the load information. As shown by FIG. 3, part (b), when the control unit 104 selects the load 114 in the UPS mode on the basis of the load information, the control unit 104 first requests the load 114 to provide load information (352). Each load 114, by responding to the request of the control unit 104, provides power usage history information of the load 114 to the control unit 104 (354). The control unit 104 generates a UPS approval by deciding the order on the basis of the power usage history of each load 114 as notification that the power is to be supplied in the UPS mode according to the order decided as a priority (356). The load 114 transmits an acknowledgement (ACK) with respect to the UPS approval to the control unit 104 (358). With the above, when the agreement with respect to the power supply at the UPS mode between the control unit 104 and the corresponding load 114 is made, the control unit 104 in the UPS mode controls the power conversion unit 106 such that the power is supplied to the corresponding load 114 according to the agreement (360).

$Dev_{sel}$, the condition of automatic selection, of the load 114, in the UPS mode shown in FIG. 3, part (b), is shown in the following Formula 1:

$$dev_{sel} = Pr_{dev} \propto \text{Conditions}$$

$$(\text{Conditions} = PW_{dev}, dev_{uptime}, dev_{frequency}, \text{Weather, DailyInformation}) \qquad [\text{Formula 1}]$$

In Formula 1, $Pr_{dev}$ refers to a degree of importance by each load 114, $Pw_{dev}$ refers to the amount of power consumption by each load 114, $dev_{uptime}$ refers to the usage time by each load 114, $dev_{frequency}$ refers to the usage frequency by each load 114, Weather refers to weather information, and DailyInformation refers to the distinction of weekdays/weekends/holidays.

From Formula 1, the reasons of considering the $dev_{uptime}$ and the $dev_{frequency}$ of the load are as follows. With respect to selecting the load 114 to be supplied with power in the UPS mode, because an excessive number of the loads 114 may be selected in certain circumstances, the amount of power that may be supplied in the UPS mode may be exceeded. The power storage unit 108, in addition to the original purpose of storing power therein, is provided with the UPS mode as an added function, and thus, the consideration of the amount of available power to perform the UPS mode is highly important. For the above, it is desired to set an upper limit of the amount of available power at the UPS mode, so that the selection of the load 114 may be made within the range that does not exceed the upper limit.

The uninterruptible power supply (UPS) is referred to as a blackout-free power supply apparatus, and is an apparatus configured to prevent an abnormal power supply due to voltage change, frequency change, a temporary power failure, and excessive voltage when common power supply or reserve power supply is being used, and to supply stable power at all times. The UPS mode in the present disclosure is an operation mode configured to utilize the power storage unit 108 as the UPS, and when an abnormal status in the power supply from the renewable energy source 110 or the power utility company 112 is detected by the control unit 104, the UPS mode is executed by generating an entry command of the UPS mode to the power conversion unit 106. The detection of the abnormal status of the power supply may be performed through the communication with the renewable energy source 110 or the power utility company 112, and also through the communication with the other apparatuses.

The calculation of the minimum capacity needed for the UPS mode to be performed is as follows: when an abnormality occurs in the power supply, the mode is changed to the UPS mode so that the power at the power storage unit 108 may only be supplied in a limited way to the some of the loads 114 selected, the control unit 104 may select some of the loads of the plurality of loads 114 on the basis of the setting of a user (FIG. 3, part (a)), or the control unit 104 automatically selects some of the loads of the plurality of loads 114 (FIG. 3, part (b)), so that the power is supplied only to the selected loads of the plurality of loads 114.

In a case of a user setting (FIG. 3, part (a)), a user directly sets the degree of importance at each load 114, and the control unit 104, through a communication with the load 114, reads the degree of importance of each load 114 and information on the amount of power consumption. The control unit 104, by sorting out the loads 114 provided with the degree of importance that is higher than a predetermined reference value, calculates the sum of the amount of the power consumption of the corresponding loads 114, and determines the calculated value as the minimum capacity needed for the UPS mode.

In a case of an automatic selection (FIG. 3, part (b)), the control unit 104, through a communication with each load 114, collects information with reference to the power usage history of each load 114, and by referring to the collected information, the control unit 104 calculates the order of priority of each load 114 to select the loads 114 having higher priorities. By using the sum of the power consumption of the selected loads 114 and the minimum available time for service, the control unit 104 calculates the minimum capacity needed for the UPS mode.

Each load 114 is provided with an inherent power factor, and by using the power factor of the power at each load 114, each load 114 may be able to calculate the size of the power needed for the operation of each load 114. For example, at the load 114 provided with the power factor of approximately 90%, the actual amount of the power needed, when the amount of power consumption is approximately 100 W, is approximately 111 W (100 W/0.9≈111 W). By using the relationship above, the actual size of the power needed for the operation of the load 114 may be determined. When configuring the minimum capacity needed for the UPS mode, it is desired to consider the actual size of the power needed at each load 114.

Because the control unit 104 and the power conversion unit 106 are involved in the overall operation of the power consumption control apparatus 102, the supply of power is needed at all times, and other than the above, the supply of power may be demanded at the particular apparatuses, which are designated by a user, at all times. By considering the amount of power consumption of the elements which need the supply of power at all times as the above, it is desired to configure the minimum capacity needed for the UPS mode.

In the UPS mode, it is important to supply the size of the power needed, but it is also important to supply the power needed as long as possible. That is, as a backup power source, it is desired to guarantee the time of the supply of the power that is greater than a certain length of time. In addition, it is more desired to configure the guaranteed minimum operation time '$t_n$' by each load 114.

In addition, when the minimum capacity needed for the UPS mode is configured by considering a margin by each load 114, the supply of power may take place in a further stable manner.

$P_{ups}$, which represents the minimum capacity needed for the UPS mode as described above, may be expressed in the following Formula 2:

$$P_{UPS} = \sum_{n=1}^{n=m} \frac{P_n}{p f_n} \times M_n \times t_n + P_{pcs+Controller+userdefine} \times t_{max} \quad \text{[Formula 2]}$$

In Formula 2, $P_n$ refers to the actual amount of power needed at a certain one of the loads 114, $P_{fn}$ refers to the power factor of the corresponding load 114, $P_{pcs+controller+userdefine}$ refers to the constant power supply that is supplied to the elements which need the supply of power at all times, $M_n$ refers to the margin by each load, $t_n$ refers to the guaranteed minimum operation time, and $t_{max}$ refers to the maximum operation time of the particular load when entering into the UPS mode. $P_{ups}$ of the minimum capacity needed for the UPS mode from Formula 2 is the capacity obtained while assuming the operation of the corresponding load 114 during a unit time, and is provided with the measurement unit 'Wh'. Thus, the capacity of power is calculated according to Formula 2 while the load 114 is selected according to Formula 1, so that the selection of the load 114 is performed within the range that is not exceeding the upper limit of the available power at the UPS mode.

Figure 4:
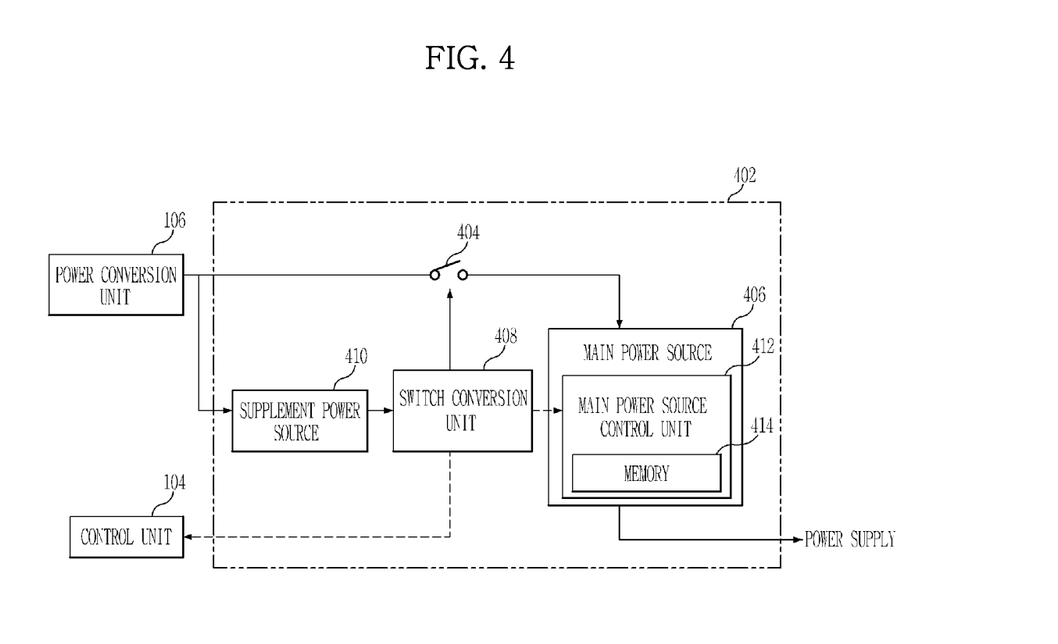
FIG. 4 is a drawing showing a power supply unit for the load shown on FIG. 1.

FIG. 4 is a drawing showing a power supply unit of the load shown on FIG. 1. The power being supplied to the load 114 through the power conversion unit 106 is supplied to an actual power consuming subject, such as a motor or a circuit board, at an inside the load 114 through the power supply unit shown on FIG. 4.

The present disclosure is provided to give a priority to some of the loads of the plurality of loads 114, and when the supply of power is not normal, to supply power first to the load 114 provided with the order of priority such that the supply of power is performed in a normal manner, and to shut off the supply of power to the remaining of the loads 114 not provided with the order of priority. However, even when the supply of power through the power conversion unit 106 is resumed in a normal manner, the loads 114 having been shut off with power may not be able to resume the operation in a normal manner due to the aftereffect of the supply of power being shut off.

A power supply unit 402 of the load 114 shown on FIG. 4 is configured to enable all the loads 114 to resume operation in a normal manner after the supply of power is shut off and resumed as the above. For the above, the power supply unit 402 shown on FIG. 4 includes a switch 404, a main power source 406, a switch controlling unit 408, and a supplement power source 410.

The switch 404 is configured to interrupt the delivery of power between the power conversion unit 106 and the main power source 406, and is turned ON/OFF by the switch controlling unit 408. A main power source controlling unit 412 is provided at the main power source 406 to control the overall operation of the main power source 406. For the above, the main power source controlling unit 412 is provided in a way to be able to electrically communicate with the switch controlling unit 408, and is provided with a memory 414 to store data. The memory 414 stores information on the status of operation of the load 114 just before the supply of power is shut off, and when the supply of power is resumed in a normal manner, on the basis of the information on the status of operation of the load 114, the operation of the load 114 is resumed in a normal manner. The switch controlling unit 408 is operated as the power is supplied from the supplement power source 410, and performs the ON/OFF control of the switch 404 and the communication with the main power source controlling unit 412, as well as the communication with the control unit 104 of the power consumption control apparatus 102 shown on FIG. 1. Since the switch controlling unit 408 is operated as the power is supplied from the supplement power supply 410, when the supply of power through the power conversion unit 106 is shut off, a normal operation of the load 114 may be possible while the power is supplied from the supplement power source 410. The supplement power source 410 may be a current storage unit such as a small-size battery or a capacitor, for example, so that the supplement power source 410 may be charged by the grid power or the renewable power being supplied through the power conversion unit 106.

Figure 5:
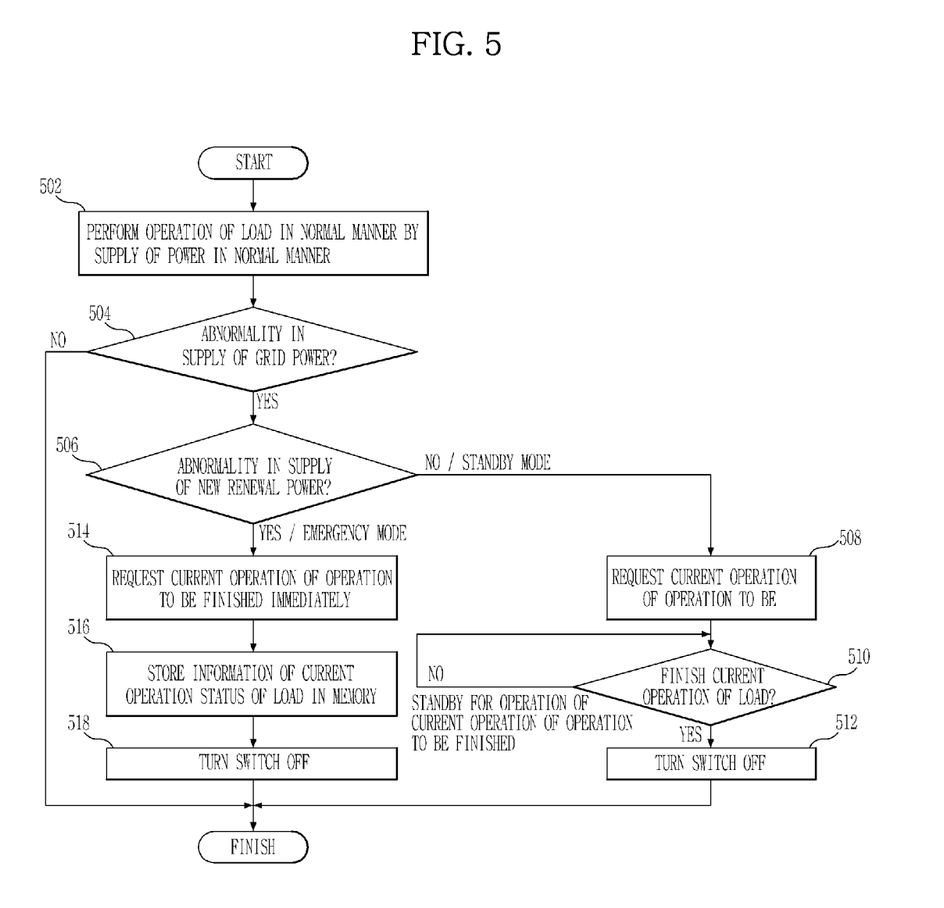
FIG. 5 is a drawing showing a control method of a power supply unit in accordance with the present disclosure.

FIG. 5 is a drawing showing a control method of a power supply unit in accordance with the present disclosure, or, in other words, a supply method of power with respect to the load 114 when the amount of the power at the power storage unit 108 is in the status of not being able to sufficiently supply the power needed at all the loads 114, that is, when the amount of the power at the power storage unit 108 is below the UPS capacity. In an embodiment of the present disclosure, the power supply unit 402 of the load 114 selects one of the control modes between <Standby Mode> and <Emergency Mode> depending on which power supply between the grid power and the renewable power, which are being supplied through the power conversion unit 106, is experiencing an abnormality, and the selection of the control mode as such is performed by the switch controlling unit 408. The <Standby Mode> is a control mode that is selected and performed when an abnormality occurs in the supply of the grid power while the supply of the renewable power is performed in a normal manner. The <Emergency Mode> is the control mode that is selected and performed when the supply of both the grid power and the renewable power is shut off. The switch controlling unit 408, through the communication with the control unit 104 of the power consumption controlling apparatus 102, checks whether the supply of the grid power and the renewable power is shut off. In the <Standby Mode> and the <Emergency Mode>, the power storage unit 108 is operated on the UPS.

As shown on FIG. 5, when the load 114 performs an operation in a normal manner as the power is supplied to the load 114 through the power conversion unit 106 in a normal manner (502), the power supply unit 402 of the load 114 determines if an abnormality occurs in the supply of the grid power (504). If no abnormality is found in the supply of the grid power ('NO' from 504), the load 114 maintains the current operation in a continuous manner without taking any action. However, if an abnormality is found in the supply of the grid power ('YES' from 504), the load 114 additionally determines if an abnormality is found in the supply of the renewable power (506). In a case that an abnormality is found in the supply of the grid power while the supply of the renewable power is normal ('NO' from 506), the power supply unit 402 performs the <Standby Mode> (508, 510, and 512). In a case then an abnormality is found both in the supply of the grid power and in the supply of the renewable power ('YES' from 506), the power supply unit 402 performs the <Emergency Mode> (514, 516, and 518).

In the <Standby Mode>, the switch controlling unit 408 of the power supply unit 402 generates a command to request the main power source controlling unit 412 to finish the current operation of the load 114 (508). After receiving the command of finishing the current operation from the switch controlling unit 408, the main power source controlling unit 412 stands by until the load 114 finishes the current operation in a safe manner ('NO' from 510), and when the load 114 finishes the current operation completely ('YES' from 510), the main power controlling unit 412 stores information of the finished task in the memory 414 and turns OFF the switch 404 (512). As the switch 404 is turned OFF, the supply of the power to the load 114 through the main power source 406 is shut off. The information of the finished task is stored in the memory 414 to be used as a reference at the time of the supply of power is resumed in a normal manner and when a following task is to be performed after the corresponding task is finished. In the <Standby Mode>, even if an abnormality in the supply of the grid power occurs, because the supply of the renewable power is being continuously supplied in a normal manner, the load 114 may stand by in a continuous manner until the operations being executed are finished in a safe manner. For example, when the load 114 is a working robot, the working robot finishes the task being performed, and after entering into a safe state, shuts off the supply of power, thereby able to secure the safety of the working robot and the surroundings thereof. In the <Standby Mode>, the switch controlling unit 408 is operated only by the renewable power that is being supplied through the power conversion unit 106 and by the supplement power that is being supplied from the supplement power source 410.

In the <Emergency Mode>, the switch controlling unit 408 of the power supply unit 402 generates a command to request the main power source controlling unit 412 to immediately finish the current operation of the load 114 (514). In a way to respond to the request of the switch controlling unit 408 to immediately finish the current operation of the load 114, the main power controlling unit 412 stores information on the progress status of the operation of the load 114 up to a current point of time (514). Then, the operation of the load 114 is immediately finished in a forced manner, and turns OFF the switch 404 (518). At this time, the switch controlling unit 408 is operated only by the power being supplied from the supplement power source 410. In the <Emergency Mode>, the operation of the load 114 is immediately finished in a forced manner to secure the safety of the load 114 by immediately finishing the operation of the load 114, as both the supply of the grid power and the supply of the renewable power are not smooth, and thereby the supply of the power supply may be supplied. For example, when the load 114 is a working robot, if the supply of the power is abruptly shut off while the working robot is performing a particular operation, the joints of the working robot may lose the strength thereof, causing the working robot to fall down or freefall, thereby causing a damage to a nearby worker or to other installations. To prevent the above, the operation of the load 114 is immediately finished in a forced manner, but in order to continue the operation of the load 114 when the supply of power is resumed in a normal manner, the information on the progress status of the operation of the load 114 up to a current point of time is stored.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A power consumption control apparatus, comprising:
   a power storage unit configured to be charged and discharged with power;
   a power conversion unit configured to perform the charging and the discharging of power of the power storage unit; and
   a control unit configured to determine an occurrence of an abnormality in a supply of a grid power and a renewable power; perform an emergency mode to immediately finish a current operation of a load if it is determined that an abnormality in the supply of both of the grid power and the renewable power has occurred; and perform a standby mode to stand by until the current operation of the load is finished in a normal manner if it is determined that an abnormality in the supply of the grid power has occurred while the supply of the renewable power is normal,
   wherein the renewable power includes power from at least one of a fuel cell, coal liquefaction/gasification, hydrogen energy, solar thermal power generation, a solar photovoltaic power generation, biomass energy, wind power generation, small hydropower generation, geothermal energy, ocean energy, and waste energy.

2. The power consumption control apparatus of claim 1, wherein the control unit, in a case of the emergency mode, stores information of a status of the current operation of the load into a memory; and turns off a switch that is involved in the supply of the power of the load.

3. The power consumption control apparatus of claim 1, wherein the control unit, in a case of the standby mode, stands by until the current operation of the load is finished in a normal manner; and turns off a switch that is involved in the supply of the power of the load after the current operation of the load is finished in a normal manner.

4. The power consumption control apparatus of claim 3, wherein the control unit supplies the renewable power to the load during a time of standing by until the current operation of the load is finished in a normal manner.

5. The power consumption control apparatus of claim 1, wherein when the load is provided in a plurality thereof and an amount of power stored at the power storage unit is less than an amount of the power consumption demanded at all of the plurality of loads, the control unit selects some of the plurality of loads, and the power is supplied only to the selected plurality of loads.

6. The power consumption control apparatus of claim 5, wherein the control unit selects the some of the plurality of loads by setting an order of priority based on a power usage history of each of the plurality of loads; and by selecting a load having a higher order of priority first, according to the set order of priority.

7. The power consumption control apparatus of claim 6, wherein the power usage history of the each of the plurality of loads comprises a usage frequency by a time period and an average usage time of the each of the plurality of loads.

8. The power consumption control apparatus of claim 5, wherein the control unit selects the some of the plurality of loads by setting an order of priority by receiving a user setting that is provided to select the some of the plurality of loads; and by selecting a load having a higher order of priority first, according to the set order of priority.

9. A non-transitory computer-readable recording medium storing a program to implement a power consumption control method, the method comprising:
   determining an occurrence of an abnormality in a supply of a grid power and a renewable power;
   performing an emergency mode to immediately finish a current operation of a load if it is determined that an abnormality in the supply of both of the grid power and the renewable power has occurred; and
   performing a standby mode to stand by until the current operation of the load is finished in a normal manner if it is determined that an abnormality in the supply of the grid power has occurred while the supply of the renewable power is normal,
   wherein the renewable power includes power from at least one of a fuel cell, coal liquefaction/gasification, hydrogen energy, solar thermal power generation, a solar photovoltaic power generation, biomass energy, wind power generation, small hydropower generation, geothermal energy, ocean energy, and waste energy.

* * * * *